United States Patent
Jarboui et al.

(10) Patent No.: US 8,121,141 B2
(45) Date of Patent: Feb. 21, 2012

(54) CONFIDENTIAL TRANSMISSION OF DATA BY CHANGE OF FREQUENCY IN A TELECOMMUNICATIONS NETWORK

(75) Inventors: Tahar Jarboui, Grenoble (FR); Florence Germain, Saint Jean le Vieux (FR); Francois Marx, Paris (FR)

(73) Assignee: France Telecom, Paris (FR)

( * ) Notice: Subject to any disclaimer, the term of this patent is extended or adjusted under 35 U.S.C. 154(b) by 61 days.

(21) Appl. No.: 12/294,977

(22) PCT Filed: Mar. 19, 2007

(86) PCT No.: PCT/FR2007/050944
§ 371 (c)(1),
(2), (4) Date: Jan. 28, 2009

(87) PCT Pub. No.: WO2007/113418
PCT Pub. Date: Oct. 11, 2007

(65) Prior Publication Data
US 2010/0177782 A1    Jul. 15, 2010

(30) Foreign Application Priority Data
Mar. 31, 2006 (FR) .................... 06 02818

(51) Int. Cl.
*H04J 3/16* (2006.01)
(52) U.S. Cl. ..................................... 370/437
(58) Field of Classification Search .......... 370/431–433, 370/436–439
See application file for complete search history.

(56) References Cited

U.S. PATENT DOCUMENTS

| 5,130,987 A | 7/1992 | Flammer |
| 5,912,918 A * | 6/1999 | Bauchot et al. ............... 375/133 |
| 6,115,407 A * | 9/2000 | Gendel et al. ................ 375/132 |
| 2002/0085622 A1 * | 7/2002 | Dhar et al. .................... 375/132 |

FOREIGN PATENT DOCUMENTS

| EP | 0 650 274 A2 | 4/1995 |
| WO | WO 01/11795 A1 | 2/2001 |

* cited by examiner

*Primary Examiner* — Huy Vu
*Assistant Examiner* — Dady Chery
(74) *Attorney, Agent, or Firm* — Drinker Biddle & Reath LLP (57) ABSTRACT

Data is transmitted by a first terminal (11) to a second terminal (12) in a telecommunications network (10) in a plurality of sets of data packets. In the first and second terminals, as a function of a selection rule common to the first and second terminals, transmission frequencies are selected from transmission frequencies in a secret list of transmission frequencies that is common to the first and second terminals. Next, the sets of data packets are transmitted (15, 16) from the first terminal to the second terminal at respective selected transmission frequencies. The common list of transmission frequencies is allocated on the basis of available frequencies with respect to the first and second terminals and collected from the telecommunications network.

19 Claims, 2 Drawing Sheets

CONFIDENTIAL TRANSMISSION OF DATA BY CHANGE OF FREQUENCY IN A TELECOMMUNICATIONS NETWORK

CROSS-REFERENCE TO RELATED APPLICATIONS

This application is the U.S. national phase of the International Patent Application No. PCT/FR2007/050944 filed Mar. 19, 2007, which claims the benefit of French Application No. 06 02818 filed Mar. 31, 2006, the entire content of which is incorporated herein by reference.

FIELD OF THE INVENTION

The present invention relates to the field of telecommunications and more particularly to the confidentiality of data transmitted in telecommunications networks.

BACKGROUND OF THE INVENTION

Generally speaking, when confidential data is transmitted in a telecommunications network it is standard practice to encrypt the data using a cryptography algorithm. The sender and receiver terminals must then be able respectively to encrypt, and to decrypt the data transmitted. Such cryptography operations require very complex calculations, a long data processing time, high usage of processor and memory resources, and a consumption of electrical power that can prove unsuitable for some sender and/or receiver terminals, for example sensors provided with a radio interface or any other small communications device having in particular limited energy endurance and limited data processing capacities.

Other methods aim to protect the confidentiality of data transmitted between two terminals without using encryption.

Some of those methods send noise data in transmission channels that are not covered by the receiver terminal. If a receiver of a potential hacker receives at least some of the transmission channels not covered by the receiver terminal and carrying noise data, the data captured by the hacker is affected by noise and cannot be used to recover the signal transmitted. The document "Secret Communication using Artificial Noise" by R. Negi and S. Goel, 2005, describes one such method of protecting data during transmission.

However, such methods can be unsuitable in some transmission contexts since they create interference on transmission channels that may be used to transmit other data.

U.S. Pat. No. 2,292,387 describes another method of protecting the confidentiality of a transmission by distributing the data to be transmitted over successive predetermined transmission frequencies. The times at which to change from one frequency to another are chosen beforehand. The sender and the receiver are synchronized by means of two identical punched paper tapes, for example, one used by the sender and the other by the receiver.

However, such methods are suitable only if the transmission frequencies used are available at all times to the sender and receiver concerned (a transmission frequency is "available" if there is no other telecommunications signal being conveyed at that frequency at a given time and in a given geographical location).

SUMMARY OF THE INVENTION

The present invention aims to overcome the above problems.

It relates to all types of objects communicating by radio with the data transmitted grouped into frames or packets (as is usual), for example mobile terminals in a suitable telecommunications network or sensors that have radio interfaces.

A first aspect of the present invention proposes a method of transmitting data from a first terminal to a second terminal in a telecommunications network adapted to transmit data in packets in which data is transmitted in a plurality of sets of data packets. The method comprises the following steps:

a) in the first and second terminals, as a function of a selection rule, selecting transmission frequencies from transmission frequencies in a secret list of transmission frequencies, said selection rule and said list of transmission frequencies being common to the first and second terminals; and b) transmitting the sets of data packets from the first terminal to the second terminal at respective selected transmission frequencies;

said list of transmission frequencies being generated in accordance with a transmission frequency list allocation rule from a list of available frequencies with respect to the first and second terminals and collected from said telecommunications network.

This kind of allocation rule generates a list of transmission frequencies for two terminals by taking frequencies from the list of available frequencies relating to those terminals.

Thus according to the invention a first set of data packets is transmitted at a first frequency, followed by a second set of data packets transmitted at a second frequency different from the first, and so on. This protects the confidentiality of the data transmitted in this way without encrypting the data sent and decrypting the data received. At the receiver end, to be able to determine the data that has been transmitted it is necessary to capture the data packets corresponding to data transmitted at a number of different transmission frequencies.

The transmission frequencies at which data can be transmitted separately are advantageously determined as a function of information collected in relation to the first and/or the second terminal, which information can be collected in the network at any time. These transmission frequencies are determined so as to optimize the use of frequencies from a given band of frequencies. Accordingly, such a list of frequencies can be updated dynamically during transmission depending on changes in the use of the band concerned. The invention is therefore particularly advantageous if the band of frequencies that can be used by terminals of the invention is also used, depending on their requirements, by third-party terminals that have priority in the band (for example, a band reserved for television signals); the method of the invention transmits data at a frequency from this "reserved" band at a time when no terminal having priority is sending or receiving at that frequency.

Moreover, this kind of method has the advantage of not inducing interference in transmissions that may be effected at transmission frequencies close to those used for the transmission in question between the first and second terminals, in contrast to methods aiming to protect the transmission of data by introducing noise on adjacent transmission frequencies.

Thus the present invention has the advantage of protecting transmitted data as well as reducing the quantity of resources used to process the data, in particular compared to cryptographic processing. This kind of transmission method also reduces data processing time.

The power consumption of the terminals sending and receiving data can therefore be reduced during transmission in a telecommunications network linking those terminals, while a high level of confidentiality of the transmitted data is maintained. Such a method can advantageously be used in terminals requiring high energy endurance, such as sensors.

What is more, these features improve the performance of the terminal at the receiving end, since no cryptographic processing is required on receiving data transmitted in this way.

In one implementation of the present invention, the first and second terminals share their knowledge of the transmission frequencies used during the data transmission concerned in a synchronized manner. The first and second terminals therefore know the transmission frequency on which each data packet is transmitted, and therefore respectively sent and received.

This sharing of knowledge can be achieved by means of a list of transmission frequencies common to both the terminals that exchange data, together with a rule for selecting a transmission frequency from that common list.

There is no limitation on how the first and second terminals obtain this list of transmission frequencies or on the shared transmission frequency selection rule.

The present invention finds an advantageous application in a network based on a network architecture in which terminals communicate directly with each other without calls being processed by a centralized network entity, as in cellular networks, for example.

The present invention is described below in its application to a centralized architecture in which a frequency determination function determines and transmits the list of transmission frequencies and the transmission frequency selection rule to the first and second terminals in order to synchronize the two terminals.

It should be noted that the greater the number of transmission frequencies used, the higher is the level of protection of the confidentiality of the transmitted data. The greater the number of sets of packets transmitted separately, i.e. at different transmission frequencies, the more difficult it is for a hacker to combine the various sets of packets to reconstitute the initial data. Note that these frequencies are preferably sufficiently far apart to prevent a hacker "eavesdropping" on a band covering a plurality of frequencies.

Each change of transmission frequency nevertheless requires processing in the sender and receiver terminals, which can impact on the transmission bit rate concerned. Thus a compromise between the number of transmission frequencies used during data transmission and the processing cost required for such changes of frequency can advantageously be reached as a function of the terminals used and the required level of protection of the confidentiality of the data, for example. A required transmission bit rate can also be taken into account in reaching any such compromise.

In one implementation of the present invention, the number of frequencies contained in the list of available frequencies relating to the first and second terminals is equal to the product of the number of frequencies contained in the list of transmission frequencies common to the first and second terminals generated according to the allocation rule and a number k determined as a function of a level of confidentiality required for transmitting the set of data packets.

Thus by varying the number k, it is possible to adapt to a required level of confidentiality in the data transmission to be effected. The greater this number k, the more the data to be transmitted is spread over a large number of separate frequencies, and therefore the more complex it is to violate transmission confidentiality.

Moreover, since the transmission frequency list is secret, any such transmission of data in accordance with the present invention offers a high level of protection against potential hackers.

The number of sets of data packets can be determined as a function of a required level of confidentiality for the data to be transmitted. Thus the number of sets of packets is preferably greater if the required level of confidentiality is high than if the required level of confidentiality is lower.

For a given total number of packets to be transmitted, a high confidentiality level can imply that each set of data packets contains, on average, fewer data packets than sets of data packets determined for a lower confidentiality level.

The present invention is described by way of non-limiting illustration in its application to the spectrum of transmission frequencies dedicated to transmitting television programs.

The first and second terminals therefore respectively send and receive in the spectrum of frequencies dedicated to television programs. Moreover, at a given time, and for a given geographical location, only a portion of the spectrum of frequencies concerned is used to transmit television programs, the remainder remaining available. One implementation of the present invention exploits this fact.

Below, and again by way of illustration, the various sets of data packets are sent separately and successively at the various transmission frequencies selected. In one implementation, some or all of the sets of data packets can be sent simultaneously at the various transmission frequencies.

In one implementation of the present invention, the determination function centralizes information on the availability of the frequencies of the spectrum that it receives from various points of the telecommunications network. The determination function can determine from this availability information a list of frequencies suitable for transmission between a first terminal and a second terminal. It can then advantageously send this list of transmission frequencies to the first and second terminals in order to synchronize the terminals with each other.

Thus the method can further comprise the following steps:
1) collecting from at least the first terminal, respectively from the second terminal, transmission frequency availability information for a given transmission frequency spectrum, said availability information relating to the first terminal, respectively the second terminal;
2) determining, as a function of said collected availability information, a list of transmission frequencies that includes transmission frequencies available both around the first terminal and around the second terminal;
3) informing said first and second terminals of said list of transmission frequencies determined in this way.

Thus by centralizing availability information received from various network units, and from the first and second terminals at least, a map of the available frequencies can be produced and a list of pertinent frequencies suitable for transmission between the first and second terminals can advantageously be generated.

According to particular features, the list of transmission frequencies can be updated on reception of new transmission frequency availability information from at least the first or the second terminal. The terminals therefore communicate with each other on the basis of up-to-date information, which avoids interference to frequencies of the spectrum concerned that are being used at the time of the update. As a general rule, updating in accordance with the invention can be effected before and/or during and/or after the call between the first and second terminals.

This updating can advantageously be effected dynamically: for a transmission that requires a long time period, the map of available frequencies may evolve and some frequencies that were available at the beginning of transmission, i.e. when the list of frequencies was generated, may no longer be available during transmission; in this situation interference to other transmissions is therefore easily and efficaciously avoided.

The centralized function in the telecommunications network can send the list of transmission frequencies to the first and second terminals in encrypted form. To enhance further the protection of the confidentiality of calls between the first and second terminals, the centralized function in the telecommunications network can also send the selection rule to the first and second terminals in encrypted form.

The transmission frequency selection rule can indicate an order in which successive transmission frequencies from the list are selected for the respective sets of packets and a condition for triggering a change of transmission frequency for the various sets of packets.

Accordingly, by means of this selection rule, the terminals are able to decide when to modify the transmission frequency for a given set of packets and which frequency to select.

The frequency change triggering condition can be a condition from the group comprising a number of packets transmitted at the same transmission frequency, a time period, and a time reference.

At most one set comprising a number N of packets could be transmitted at the same transmission frequency, with the transmission frequency modified every N packets. Also, the transmission frequency could be modified periodically or at precise times, especially if the various sets of packets are transmitted successively.

In one implementation of the present invention, the list of frequencies comprises frequencies suitable both for transmitting data from the first terminal to the second terminal and for transmitting data from the second terminal to the first terminal.

A second aspect of the present invention proposes a terminal for transmitting data in packets in a telecommunications network to another terminal, said data being transmitted in a plurality of sets of data packets. The terminal includes:
- a storage unit for storing a secret list of transmission frequencies and a rule for selecting frequencies in said list of frequencies;
- a selection unit for selecting transmission frequencies from the transmission frequencies in said list of frequencies as a function of said selection rule;
- a first interface unit for sending and/or receiving the sets of data packets to and/or from said other terminal at respective selected transmission frequencies;

said list of transmission frequencies being generated according to a transmission frequency list allocation rule from a list of available frequencies with respect to said terminal and to said other terminal and collected from said telecommunications network.

If a centralized function in the telecommunications network sends the list of transmission frequencies and/or the selection rule, the terminal can further comprise a second interface unit for receiving said list of frequencies and/or said selection rule from said centralized function.

The transmission frequency or frequencies respectively selected for said sets of packets to be transmitted can be updated if the second interface unit receives a new list of frequencies.

A third aspect of the present invention proposes a central entity in a telecommunications network for transmitting data in packets from a first terminal to a second terminal, said data being transmitted in a plurality of sets of data packets. The central entity includes:
- a storage unit for collecting from the telecommunications network transmission frequency availability information relating to the first and second terminals and for maintaining a list of available frequencies with respect to the first and second terminals;
- an allocation unit for determining, as a function of said availability information collected, a list of transmission frequencies that includes transmission frequencies available both around the first terminal and around the second terminal;
- an interface unit for transmitting said list of transmission frequencies to said first and second terminals.

The list of transmission frequencies can be updated on receiving new information on the availability of transmission frequencies from the first or second terminal or from any other network device.

This entity can further comprise a cryptography unit for encrypting the list of transmission frequencies to be sent to the first and second terminals.

A fourth aspect of the present invention proposes a system for transmitting data between a first terminal and a second terminal according to the second aspect of the present invention.

The system can further comprise a central entity according to the third aspect of the present invention.

A fifth aspect of the present invention proposes a computer program intended to be installed in a terminal of a telecommunications network and comprising instructions adapted to execute a method according to the first aspect of the present invention on execution of the program by processing means of the terminal according to the second aspect of the present invention.

A sixth aspect of the present invention proposes a computer program intended to be installed in a central entity of a telecommunications network and comprising instructions adapted to execute a method according to the first aspect of the present invention on execution of the program by processing means of the central entity according to the third aspect of the present invention.

A seventh aspect of the present invention proposes a computer-readable storage medium storing the computer program according to the fifth or sixth aspect of the present invention.

BRIEF DESCRIPTION OF THE DRAWINGS

Other aspects, objects and advantages of the invention become apparent on reading the description of one implementation of the invention. The invention can also be better understood with the aid of the drawings, in which.

DETAILED DESCRIPTION OF THE INVENTION

Figure 1:
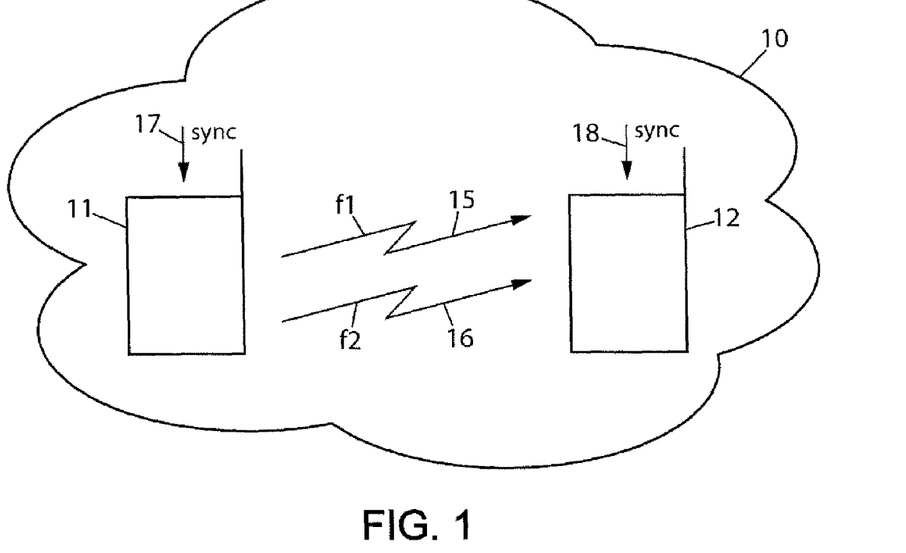
FIG. 1 shows the main steps of one implementation of a transmission method of the present invention.

FIG. 1 shows the main steps of one implementation of a data transmission method of the present invention.

A first terminal 11 and a second terminal 12 belong to a radio telecommunications network 10.

Firstly, the terminals 11 and 12 obtain synchronization information in steps 17 and 18, respectively. In one implementation of the present invention, this synchronization information corresponds to a secret list of transmission frequencies at which the terminals 11 and 12 can communicate and a rule for selecting one or more transmission frequencies from the list. For example, the list of transmission frequencies can be sent to both terminals or sent by one terminal to the other in encrypted form. Accordingly, having the same list of transmission frequencies and applying the same selection rule, the terminals 11 and 12 can be synchronized to the same transmission frequency or frequencies; the data packets to be transmitted between the terminals 11 and 12 can then be transmitted in clear without encryption.

For example, the selection rule can indicate selecting a transmission frequency in the order in which the transmission frequencies appear in the list and changing the transmission frequency after sending, respectively receiving, a particular number of packets. The order of the transmission frequencies in the list of transmission frequencies can then be determined by the rule for allocating the list of transmission frequencies.

However, the present invention can easily be applied if the selection rule is different. In particular a new transmission frequency can be selected periodically after a particular time period or at times determined by the selection rule common to the two terminals. Some types of transmission frequency synchronization in accordance with the selection rule can therefore require time synchronization of the terminals 11 and 12.

In one implementation of the present invention, the listed transmission frequencies are not in any particular order and the frequency selection rule corresponds to using the transmission frequencies in increasing value order.

In a variant of this implementation, the frequency selection rule can indicate selecting the transmission frequencies from the list of transmission frequencies in decreasing value order.

In one implementation of the present invention there is no limitation on the selection rule or the list of transmission frequencies, a feature of this selection rule and this list of transmission frequencies being that together they enable synchronization of the two terminals for sending and receiving data.

In one implementation of the invention data to be transmitted is divided between two or more sets of packets of data to be transmitted separately. Thus a first set of data packets is transmitted at a first transmission frequency $f_1$ selected from the list as a function of the selection rule, constituting a transmission 15, and a second set of data packets is transmitted at a second transmission frequency $f_2$, selected from the list as a function of the selection rule, constituting a transmission 16, the transmission frequency $f_2$ being different from the transmission frequency $f_1$.

To increase the level of protection of the confidentiality of the data, it can be transmitted in a greater number of separate transmissions.

Figure 2:
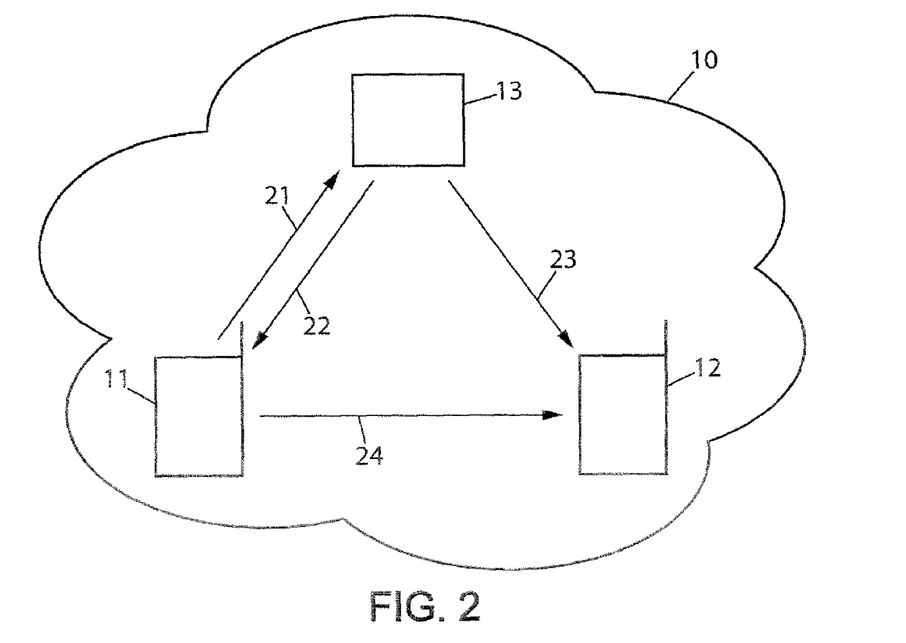
FIG. 2 shows one implementation of a radio telecommunications network of the present invention.

FIG. 2 shows one embodiment of a telecommunications network 10 of the present invention, which includes a first terminal 11, a second terminal 12, and a central entity or base station 13.

Such networks can comprise a greater number of terminals. The terminals of the network analyze the state of the spectrum of TV frequencies and inform the base station of this by sending it frequency availability information. The base station stores all this information and, based on it, selects a list of communication frequencies available and suitable for the first and second terminals. It can be advantageous for only terminals that are not communicating to analyze the TV frequency spectrum.

In one embodiment of the present invention, if the terminal 11 is seeking to transmit data to the terminal 12, it sends the base station 13 a transmission request 21. This request can advantageously indicate that transmission is required between the terminal 11 and the terminal 12. It can also indicate the quantity of data to be transmitted. The base station can then use this information to determine the number of frequencies to be inserted into the list of frequencies to be sent to the terminals 11 and 12. For example, if a required confidentiality protection level calls for a change of frequency every N data packets transmitted, the base station can easily determine the number of frequencies to be inserted into the list of frequencies.

In a variant of this embodiment, the terminal 11 can indicate directly the number of frequencies required to transmit the data to the terminal 12 securely, for example in the transmission request 21.

If the data to be transmitted from the terminal 11 to the terminal 12 is a stream of data whose size is not known in advance, the number of frequencies in the list can be decided entirely as a function of the required confidentiality level.

Whether the number of frequencies in the list is determined in the terminal 11 or in the central entity 13, it can advantageously be determined on the basis of a parameter that indicates a number of packets per frequency. This kind of parameter makes it possible to achieve an optimum compromise between the level of confidentiality or security of the transmission and the transmission bit rate.

In a variant of this embodiment, the base station can recover a required level of confidentiality from the terminal 12, with the level indicated in the request 21, for example, or the base station can obtain the level of confidentiality by any other means. Then, on the basis of that level of confidentiality, it can determine the number of frequencies to be inserted into the list of frequencies to be sent.

The base station can also obtain a required transmission bit rate from the terminal 11 or by any other means. It can then advantageously also determine the number of frequencies in the list of frequencies as a function of the level of confidentiality and the required bit rate value, in order to achieve the best possible compromise between security and transmission bit rate.

On receiving this request 21, and as a function of the information it contains, the base station therefore determines a list of frequencies to be sent to the terminals 11 and 12, i.e. a list of frequencies from those detected as being available in relation to the terminals 11 and 12. It then sends this list of transmission frequencies to the terminal 11 in an allocation message 22 and to the terminal 12 in an allocation message 23.

In the context of the present invention any method can be used to determine the frequencies that are available at a given time both at the geographical location of the first terminal and at the geographical location of the second terminal.

The list of transmission frequencies can also be constructed in an architecture that is not centralized, for example by having the first and second terminals exchange directly availability information that is available to them. Thus one of the two terminals can maintain an up-to-date list of frequencies and send it to the other terminal in order to agree the transmission frequencies.

One implementation of the present invention uses a cognitive radio method that seeks to determine available transmission frequencies in a given spectrum of transmission frequencies in a radio communications network. Such methods are known to the person skilled in the art.

Thus when the terminals or the base station are not communicating, they scan a particular frequency spectrum. If a terminal or the base station detects a change, it advises the base station of this by sending it availability information. As this availability information varies in time and geographically, it is as well to provide for regular updates.

Thus the base station collects information from the various terminals of the network. On the basis of the availability information it has collected, the base station constructs a frequency availability map, which can advantageously be estimated in real time.

This map is used to determine transmission frequencies common to at least two terminals seeking to exchange data at a given time. The map evolves with time and is therefore preferably and advantageously updated regularly on the basis of the information on the availability of the various frequencies that are used by the various terminals of the network. The list of transmission frequencies suitable for communication between two terminals is also liable to evolve.

The telecommunications network concerned can also comprise devices adapted to feed back to the central entity 13 frequency availability information other than the terminals.

The allocation messages 22 and 23 can also indicate a frequency selection rule common to the terminals 11 and 12. However, this frequency selection rule can be obtained by the terminals 11 and 12 by any other means. Thus in one embodiment the selection rule can be known and shared beforehand by the two terminals 11 and 12.

In one implementation of the present invention, only the list of frequencies sent in the allocation messages 22 and 23 is encrypted using an encryption key and so only the terminals 11 and 12 know the list.

For even higher security, the messages 22 and 23 can contain the selection rule in encrypted form. In one embodiment, the frequency selection rule is inserted into each of the terminals 11 and 12 secretly, for example during manufacture.

Once the terminals 11 and 12 have a secret list of transmission frequencies and a frequency selection rule, which can also be secret, secure transmission 24 from the terminal 11 to the terminal 12 can take place. The terminal 11 can then transmit a set of data packets at a frequency selected from the list as a function of the selection rule and the terminal 12 can receive that set of data packets at that frequency, which it selects by applying the same selection rule to the same list of frequencies, the sets of packets constituting the data to be transmitted being transmitted at different frequencies selected from the list as a function of the selection rule.

Should new availability information lead the base station to deduce that at least some frequencies from the list of frequencies are now busy, unavailable or jammed, the base station can generate an updated list of frequencies and send it to the terminals 11 and 12. This updating can optionally be accompanied by changing the frequency selection rule. It can also be effected by sending only the frequency or frequencies to be modified, to avoid sending a complete list including frequencies that have already been sent.

Thus one implementation of a method of the present invention advantageously enables protection of transmission confidentiality without causing interference to any adjacent frequencies used. In its application to the TV frequency spectrum, so as not to interfere with adjacent transmissions, the present invention enables use of the entire spectrum, but this use is limited to the frequencies from the spectrum that are temporarily available.

In one implementation of the invention, to guarantee a certain level of transmission security, the number of frequencies available is greater than the product of the number of frequencies to be inserted into the list, as defined above, and a specific parameter k of the system. This specific parameter is advantageously used to vary the required level of confidentiality: a high value of k is chosen if a high level of confidentiality is required (and, if necessary, calls are barred if the number of frequencies available is too low to comply with this value of k). Thus it is possible to guard against one or more "pirate" devices jamming a multitude of frequencies, thus leaving only a few frequencies available and, by reducing the number of available frequencies in this way, enabling potential hackers to intercept all the data packets and reconstruct the data transmitted.

To transmit the list of frequencies or the selection rule to the terminals 11 and 12 in encrypted form, two different session keys can be calculated, for the terminal 11 and the terminal 12, respectively.

In one implementation of the present invention, on transmission from the terminal 11 to the terminal 12, if the data to be transmitted comprises a particular number of packets and the selection rule indicates taking frequencies in their order in the list of frequencies and changing frequency every N data packets, the terminal 11 sends the data to the terminal 12 in the form of N packets per frequency and in the order of the frequencies in the list.

The terminal 12 has the information enabling it to receive these sets of N packets correctly and therefore switches from one frequency in the list of common frequencies to the next every N packets per frequency.

If the amount of data to be transmitted is not known in advance, for example with a walkie-talkie type call, the terminal 11 sends to the terminal 12 a set of N packets per frequency in the order of the frequencies in the list, if necessary cyclically should the amount of data to be transmitted and the number of frequencies in the list require it. However, in this situation, a lower level of confidentiality may then be achieved.

There can be provision for the terminal 11 to inform the terminal 12 of the end of transmission. Thus after receiving an end of transmission signal, the terminal 12 seeking to respond to the terminal 11 requests a new list of frequencies from the base station. All the steps described above with reference to FIG. 2 for the terminal 11, respectively the terminal 12, are then applied to the terminal 12, respectively the terminal 11.

If the receiver terminal 12 receives nothing during a given time period T, it can send the terminal 11 a signaling message at a particular signaling frequency available between the two terminals 11 and 12. On sending, respectively receiving, this signaling message, the terminal 11, respectively the terminal 12, is resynchronized, and they can therefore resume the process to send the remaining sets of packets, for example by starting again from the first frequency selected in the list according to the selection rule.

If jamming is detected when sending at a selected frequency, the terminal 11 can send a new message 21 requesting a new list of frequencies from the central entity. The sending in progress can continue on the basis of a new list of frequencies received in response to this request.

To increase the data transmission security level, it can be advantageous to provide for allocating a new list of frequencies via the messages 22 and 23 after a particular time period.

In some circumstances, in particular if the amount of data to be sent is known to the terminal 11 prior to transmission, the terminal 11 can detect in advance that the number of frequencies in the received list of frequencies is insufficient to achieve a particular transmission security level. It can then be advantageous to anticipate this lack of frequencies by again sending the base station a frequency allocation request 21, while continuing to manage the transmission of data in accordance with one embodiment of the present invention.

If the base station sends the list of frequencies in encrypted form, this time period can be determined as a function of an estimate of the time to breach the confidentiality of the encryption key or keys used. In this context, the base station can itself manage triggering of regular sending of a new list of frequencies. Alternatively, it is equally possible for the sender terminal 11 to trigger regular sending of new lists of frequencies by regularly sending a request message 21.

For example, if the list of frequencies is encrypted using a DES (Data Encryption Standard) algorithm, it takes about two hours to "break" a 56-bit DES secret key. During this time, the terminals 11 and 12 can communicate in complete safety at frequencies from the list received from the base station. If the list of frequencies is sent again after a certain time period, the new list sent is encrypted, preferably using a secret key different from the previous key, which may have been found out during this time period.

In one implementation of the invention, several types of packets can be transmitted from the terminal 11 to the terminal 12.

Figure 3:
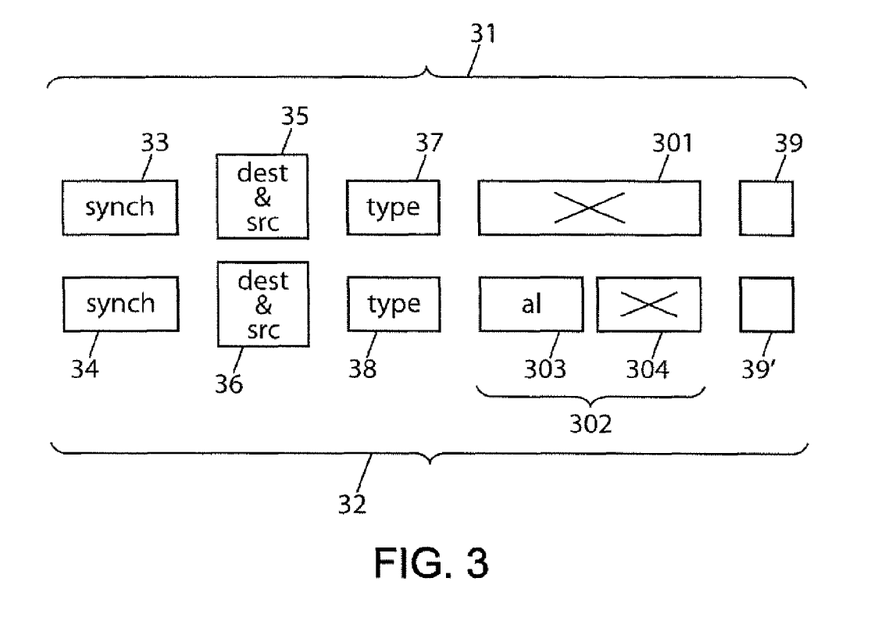
FIG. 3 shows data packet formats according to one implementation of the present invention.

FIG. 3 shows a format 31 for data packets in clear, i.e. unencrypted data packets, and a format 32 for encrypted data packets according to one embodiment of the present embodiment. The packets transmitted are preferably of identical size. Each packet comprises an 8-byte header field 33-34 corresponding to a synchronization field used to synchronize the sender terminal 11 and the receiver terminal 12. This kind of packet then comprises a field 35-36 indicating an identifier of the receiver terminal ('dest' standing for destination) and an identifier of the sender terminal ('src' standing for source). This field 35-36 can have a size of two bytes. This packet further includes a field 37-38 indicating the packet type. A field 39-39' indicating the end of the packet is then placed at the end of the packet. The size of this latter packet can be one byte. The data transmitted can be partly transmitted between the field 37-38 indicating the type and the end of packet field 39-39', in a data field 301 in the data packet 31 or a data field 302 in the encrypted data packet 32. The field 302 contains a random data portion 303 and an encrypted data portion 304.

Thus the encrypted data packet format can be used to transmit from the central entity to the terminals the list of frequencies to be used for secure transmission in accordance with one embodiment of the present invention. Encryption is then effected using a session key calculated as a function of a secret key that can be specific to each terminal. The secret keys of the terminals can be symmetrical keys with a fixed size of 16 bytes, for example. The encryption and decryption algorithm can be an AES (Advanced Encryption Standard) algorithm. Thus encryption and decryption can advantageously be implemented in hardware. Moreover, a high level of security against possible attacks is achieved. The base station having greater calculation and memory capacity than the terminals, it can in particular store the secret keys of all the terminals of the telecommunications network 10.

Figure 4:
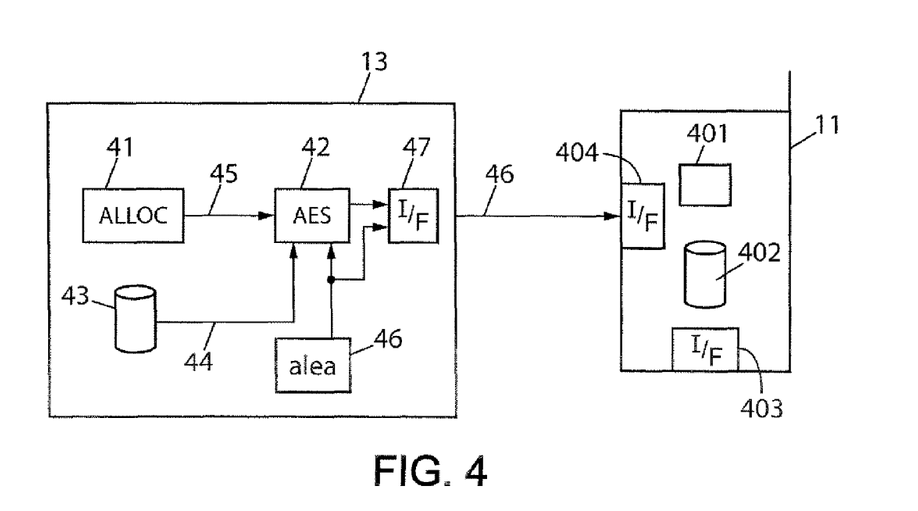
FIG. 4 shows a step of managing and sending a list of frequencies in accordance with one implementation of the present invention.

FIG. 4 shows in more detail the sending of the list of frequencies from the base station 13 to the terminals 11 and 12. In this example, the list is coded on 16 bytes, a frequency is coded on two bytes, and an encrypted data packet can contain a list of eight frequencies. After determining the list of frequencies available from a current state of the spectrum obtained as a function of the availability information received from the various terminals of the network, the base station 13 selects a required number of frequencies and places them in a random order to obtain the list of frequencies to be sent.

The base station 13 includes a storage unit 43 for collecting from the telecommunications network information on the availability of transmission frequencies relating to terminals and obtaining a list of frequencies available relating to those terminals. This storage unit 13 includes a database holding a list of available frequencies relating to the terminals concerned obtained on the basis of collected frequency availability information. Moreover, this database stores the secret keys of the terminals of the network 10. The base station 13 also includes an allocation unit 41 adapted to generate, as described in detail above, a list of frequencies suitable for transmission by the terminal 11 to the terminal 12. It also includes a cryptography unit 42 for encrypting data, a random value generator unit 46, and an interface unit 47 for communicating with the various terminals of the network 10. If the base station has to allocate frequencies to the terminal 11, for example, the secret key of the terminal 11 is recovered 44 in the database and supplied to the cryptography unit 42 and a list of frequencies is supplied 45 to the cryptography unit from the allocation unit. Furthermore, the generator unit 46 supplies a random value to the cryptographic unit 42 and to the interface unit 47.

The cryptography unit 42 then encrypts the list of frequencies using a session key generated from the random value and the secret key of the terminal 11 and supplies the list of allocated frequencies to the terminal 11 in encrypted form.

The interface unit 47 can then send the terminal 11 the random value and the list of encrypted frequencies, in the fields 303 and 304, respectively, using the same format as the encrypted data packet 302.

On receiving this information, the terminal 11 then determines the value of the session key from the random value and its own secret key, and decrypts the list of frequencies using that session key.

In one implementation of the present invention, the terminal 11 therefore includes a storage unit 402 for storing a list of transmission frequencies and a rule for selecting frequencies from the list of frequencies. It also includes a selection unit 401 for selecting respective transmission frequencies for the sets of data packets from the frequencies in the list of frequencies and as a function of the selection rule. It further includes a first interface unit 403 for transmitting the sets of data packets at the respective selected transmission frequencies. The terminal 12 includes a similar interface for receiving the sets of data packets at the respected selected transmission frequencies.

It further includes a second interface unit 404 for receiving from the base station 13 said list of frequencies and, where applicable, said selection rule.

In one embodiment of the present invention, the network 10 is a network of domestic terminals in a house that are connected to a domestic gateway that is responsible for operations similar to those described above for the base station 13.

Each terminal of the network 10 includes a sensor with a radio interface. Terminals exchange information for remote-control of actuators. Calls between terminals can require a high level of security if they concern critical information, for example an access code to enter the house or a code for activating or deactivating an alarm in the house. Under such circumstances, the amount of critical information to be transmitted is relatively small and the level of security required is relatively high. It can then be advantageous to change frequency for each packet of data transmitted. Moreover, the specific parameter k as defined above is preferably chosen with a relatively high value to increase the transmission security level. The time at the end of which a new list of frequencies is generated and sent to the terminals as described above is chosen with a relatively low value in order to avoid as much as possible interception of the data transmitted by violation of the secret encryption key used.

In a similar context, i.e. in a domestic network, but when less critical data is exchanged, for example in the context of a voice conversation between two terminals in the same house, the transmission confidentiality can be less important than the transmission bit rate. The number of packets per frequency can then be increased to a relatively high value to optimize the compromise between the communication bit rate and the security level of such transmission.

The invention claimed is:

1. A method of transmitting data in a plurality of sets of data packets from a first terminal to a second terminal in a telecommunications network adapted to transmit data in packets, the method comprising:
   a) receiving in the first terminal and the second terminal a selection rule and a secret list of transmission frequencies from said telecommunications network;
   b) selecting in the first and second terminals transmission frequencies from the secret list of transmission frequencies using said selection rule; and
   c) transmitting the plurality of sets of data packets from the first terminal to the second terminal at respective selected transmission frequencies,
   wherein said secret list of transmission frequencies is generated in accordance with a transmission frequency list allocation rule from a list of available frequencies received from the first and second terminals and collected by said telecommunications network, and
   wherein the number of frequencies contained in said list of available frequencies with respect to said first and second terminals is equal to the product of the number of frequencies contained in said list of transmission frequencies common to said first and second terminals generated according to the allocation rule and a specific number determined as a function of a level of confidentiality required for transmitting said sets of data packets.

2. A data transmission method according to claim 1, wherein the number of sets of data packets in the plurality of sets of packets is determined as a function of a level of confidentiality required for the data to be transmitted.

3. A data transmission method according to claim 1, further comprising:
   1) collecting from at least the first terminal and the second terminal, transmission frequency availability information for a given transmission frequency spectrum, said availability information relating to respectively the first terminal and the second terminal;
   2) determining, as a function of said collected availability information, a list of transmission frequencies that includes transmission frequencies available both around the first terminal and around the second terminal;
   3) informing said first and second terminals of said list of transmission frequencies determined in this way.

4. A data transmission method according to claim 3, wherein the list of transmission frequencies is updated on receiving new transmission frequency availability information from at least the first or the second terminal.

5. A data transmission method according to claim 3, wherein a centralized function in the telecommunications network sends the list of transmission frequencies in encrypted form to the first terminal and the second terminal.

6. A data transmission method according to claim 1, wherein the transmission frequency selection rule indicates an order in which the transmission frequencies in said secret list of transmission frequencies are successively selected for the respective sets of packets and a condition for triggering a transmission frequency change.

7. A data transmission method according to claim 6, wherein the frequency change triggering condition is a condition from the group comprising a number of packets transmitted at the same transmission frequency, a time period, and a time reference.

8. The data transmission method of claim 1, wherein the secret list of transmission frequencies does not include sequential frequencies.

9. The data transmission method of claim 1, wherein each of the frequencies in the secret list of transmission frequencies is only used once.

10. A terminal for transmitting data in packets in a telecommunications network to another terminal, said data being transmitted in a plurality of sets of data packets, the terminal comprising:
    a storage unit configured to store a secret list of transmission frequencies and a rule for selecting frequencies in said list of frequencies;
    a selection unit configured to select transmission frequencies from the transmission frequencies in said list of frequencies using said selection rule;
    a first interface unit configured to send and/or receive the sets of data packets to and/or from said other terminal at respective selected transmission frequencies;
    said list of transmission frequencies being generated according to a transmission frequency list allocation rule from a list of available frequencies for said terminal and for said other terminal and collected from said telecommunications network,
    wherein the number of frequencies contained in said list of available frequencies with respect to said terminal and said other terminal is equal to the product of the number of frequencies contained in the list of transmission frequencies common to said terminal and said other terminal generated according to said allocation rule and a specific number determined as a function of a level of confidentiality required for transmitting said sets of data packets.

11. A terminal according to claim 10, further comprising:
    a second interface unit configured to receive said frequency list and/or said selection rule from a central entity, if the central entity in the telecommunications network is adapted to send the list of transmission frequencies and/or the selection rule.

12. A terminal according to claim 10, wherein the second interface unit is configured to receive a new list of frequencies, and configured to update the respective transmission frequencies selected for said sets of packets to be transmitted.

13. A system for transmitting data in a telecommunications network adapted to transmit data in packets, said data being transmitted in a plurality of sets of data packets,
    wherein the system comprises a first terminal and a second terminal according to claim 10, between which said transmission is effected.

14. The terminal of claim 10, wherein the rule for selecting frequencies is stored in the storage unit during manufacture.

15. A central entity in a telecommunications network for transmitting data in packets from a first terminal to a second terminal, said data being transmitted in a plurality of sets of data packets, the central entity comprising:
    a storage unit configured to collect from the telecommunications network transmission frequency availability information relating to the first and second terminals and configured to maintain a list of available frequencies with respect to the first and second terminals;

an allocation unit configured to determine as a function of said availability information collected, a list of transmission frequencies that includes transmission frequencies available both around the first terminal and around the second terminal;

an interface unit configured to transmit said list of transmission frequencies to said first and second terminals, wherein the central entity is different from the first terminal and the second terminal, wherein the number of frequencies contained in said list of available frequencies with respect to said first and second terminals is equal to the product of the number of frequencies contained in said list of transmission frequencies common to said first and second terminals generated according to an allocation rule and a specific number determined as a function of a level of confidentiality required for transmitting said sets of data packets.

16. A central entity according to claim 15, wherein the allocation unit is configured to update the list of transmission frequencies is after receiving new transmission frequency availability information from at least the first terminal or the second terminal.

17. A central entity according to claim 15, further comprising a cryptography unit for encrypting the list of transmission frequencies to be sent to the first terminal and the second terminal.

18. A data transmission system comprising a central entity according to claim 15.

19. A non-transitory computer-readable storage medium storing instructions adapted to cause a computer to execute a method according to claim 1.

* * * * *